United States Patent Office 2,815,367
Patented Dec. 3, 1957

2,815,367

POLYCHLOROSALIGENIN ESTERS OF 2,2-DI-CHLOROPROPIONIC ACID

Herman O. Senkbeil, Midland, Mich., assignor to The Dow Chemical Company, Midland, Mich., a corporation of Delaware No Drawing. Application October 22, 1956,
Serial No. 617,259

4 Claims. (Cl. 260—479)

This invention relates to the polychlorosaligenin esters of 2,2-dichloropropionic acid having the formula

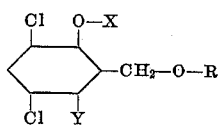

In this and succeeding formulas, Y represents hydrogen or chlorine, R represents 2,2-dichloropropionyl and X represents hydrogen or R. These compounds are crystalline solids or viscous liquids somewhat soluble in many organic solvents and substantially insoluble in water. They have been found to be active as plant growth control materials and are adapted to be employed for the control of the growth and the killing of weeds and for the sterilization of soil with regard to the growth of plants. They are also useful as parasiticides for the control of insects and fungal organisms such as *Rhizoctonia solani*.

The new monoester compounds may be prepared by the reaction of 2,2-dichloropropionic acid with a polychlorosaligenin of the formula

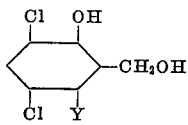

The reaction may be carried out in the presence of an acid catalyst such as sulfuric acid, phenol sulfonic acid or a cation exchange resin in the acid form and conveniently in a water-immiscible solvent such as ethylene dichloride or toluene. The molar ratio of the reactants to be employed is not critical since some of the desired product is produced with any proportion of the reactants. Good results are obtained when employing substantially equimolecular proportions of the reactants. The employment of an excess of the polychlorosaligenin and the removal of the water of reaction as formed generally result in optimum yields.

In carrying out the reaction, the 2,2-dichloropropionic acid, polychlorosaligenin and catalyst, if employed, are admixed and the resulting mixture heated at a temperature of from 75° to 180° C. for a period of time to complete the reaction. In an alternative procedure, the 2,2-dichloropropionic acid, polychlorosaligenin and catalyst, if employed, may be dispersed in a water-immiscible solvent and the mixture heated at the boiling temperature. During the heating, a mixture of water of reaction and some of the solvent is continuously distilled from the reaction zone, condensed, separated and the solvent recycled.

Upon completion of the reaction, the desired monoester product may be separated by fractional distillation under reduced pressure. Where the desired ester is a solid it may be removed from the cooled reaction mixture by filtration and thereafter recrystallized from various organic solvents. Alternatively, the solvent mixture of the reaction product may be neutralized with an alkali such as dilute aqueous sodium carbonate. The resulting mixture divides into an aqueous layer and a solvent layer. The solvent layer which contains the monoester reaction product is separated, washed with water and fractionally distilled under reduced pressure to separate the desired monoester compound.

The new diester compounds are produced by the reaction of 2,2-dichloropropionic anhydride with one of the previously prepared polychlorosaligenin monoesters of 2,2-dichloropropionate. The reaction takes place smoothly at the temperature range of from 90° to 180° C. with the production of the desired diester and 2,2-dichloropropionic acid of reaction. Good results are obtained when substantially equimolecular proportions of the reactants are employed. A large excess of the acid anhydride may be employed in the reaction mixture since such excess does not appreciably effect the course of the reaction. The removal from the reaction zone of the 2,2-dichloropropionic acid of reaction as formed generally results in optimum yields of the desired diester product.

In carrying out the reaction, the 2,2-dichloropropionic anhydride and polychlorosaligenin monoester of 2,2-dichloropropionic acid are mixed together and the resulting mixture heated at a temperature of from 90° to 180° C. for a period of time to complete the reaction. The heating may be carried out under reduced pressure and at a temperature at which the 2,2-dichloropropionic acid of reaction boils to effect the removal of said by-product acid as formed. Upon completion of the reaction, the desired diester product may be separated by fractional distillation under reduced pressure. When the diester product precipitates as a crystalline solid in the cooled reaction mixture, this solid product may be separated by filtration and purified by recrystallization from various organic solvents.

The following examples illustrate the invention but are not to be construed as limiting:

*Example 1.—3,5-dichlorosaligenin α-mono(2,2-dichloropropionate)*

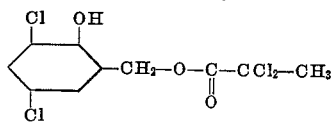

47 grams (0.24 mole) of 3,5-dichlorosaligenin and 38.3 grams (0.26 mole) of 2,2-dichloropropionic acid were dissolved in 150 milliliters of ethylene dichloride. The resulting mixture was heated at a temperature of from 98° to 117° C. for 40 hours. The heating was carried out with the continuous distillation of the water of reaction and some of the solvent as previously described. Following the heating period, the solvent was removed under reduced pressure to obtain a 3,5-dichlorosaligenin α-mono(2,2-dichloropropionate) product as a solid residue. This product after crystallization from a petroleum ether boiling at 60°–90° C. melted at 46°–49° C.

*Example 2.—3,5,6-trichlorosaligenin α-mono(2,2-dichloropropionate)*

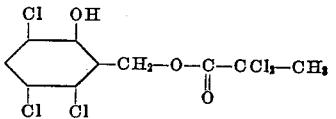

A mixture of 113.7 grams (0.5 mole) of 3,5,6-trichlorosaligenin and 71.5 grams (0.5 mole) of 2,2-dichloropropionic acid dissolved in 300 milliliters of ethylene dichloride was heated at a temperature of from 95° to 101° C. for 39 hours. During the heating period, the water of reaction was continuously removed along with some of the solvent. Upon completion of the reaction, the solvent was distilled off under reduced pressure to obtain a 3,5,6-trichlorosaligenin α-mono(2,2-dichloropropionate) product as a solid residue. This product was crystallized from a petroleum ether boiling at 30°–60° C. and was found to melt at 93°–96° C. and to contain 50.3 percent chlorine which agreed with the theoretical percent.

*Example 3.—3,5-dichlorosaligenin bis(2,2-dichloropropionate)*

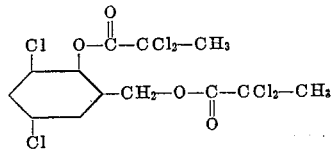

A mixture of 22 grams (0.069 mole) of 3,5-dichlorosaligenin α-mono(2,2-dichloropropionate) and 20.4 grams (0.076 mole) of 2,2-dichloropropionic anhydride was heated at a temperature of from 120° to 145° C. for a period of 45 hours. During the heating period, the 2,2-dichloropropionic acid of reaction was continuously distilled from the reaction mixture as formed. Upon completion of the reaction, the resulting mixture was fractionally distilled under reduced pressure to separate a 3,5-dichlorosaligenin bis(2,2-dichloropropionate) product as a viscous liquid boiling at 186°–189° C. at 1.5 millimeters pressure and having a saponification equivalent of 227.5 compared to the theoretical equivalent of 221.5.

In a similar manner, 3,5,6-trichlorosaligenin bis(2,2-dichloropropionate) may be prepared by reacting 3,5,6-trichlorosaligenin successively with 2,2-dichloropropionic acid and 2,2-dichloropropionic anhydride. This compound has a molecular weight of 477.

The new compounds of the present invention are effective as herbicides and fungicides. For such use the products may be dispersed on an inert finely divided solid and employed as dusts. Such mixtures may also be dispersed in water with the aid of a wetting agent and the resulting aqueous dispersions employed as sprays. The products may likewise be employed as active toxic constituents of oil-in-water emulsions or water dispersions with or without the addition of wetting, dispersing or emulsifying agents. In representative operations, 100 percent controls of the growth of the seeds and emerging seedlings of oats and canary grass were obtained when 3,5-dichlorosaligenin α - mono(2,2 - dichloropropionate) was applied at the rate of 20 pounds per acre to soil previously planted with said species.

I claim:

1. Polychlorosaligenin esters of 2,2-dichloropropionic acid having the formula

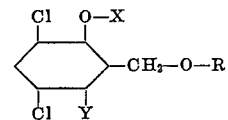

in which Y represents a member of the group consisting of hydrogen and chlorine, R represents 2,2-dichloropropionyl and X represents a member of the group consisting of hydrogen and R.

2. 3,5 - dichlorosaligenin α - mono(2,2 - dichloropropionate).

3. 3,5,6-trichlorosaligenin α - mono(2,2 - dichloropropionate).

4. 3,5-dichlorosaligenin bis(2,2-dichloropropionate).

No references cited.